United States Patent [19]

Sauer

[11] 4,328,645
[45] May 11, 1982

[54] MULTIPLE SPINDLE FLEXIBLE SANDING HEAD

[75] Inventor: Joseph J. Sauer, Arlington, Tex.

[73] Assignee: The Boeing Company, Seattle, Wash.

[21] Appl. No.: 156,282

[22] Filed: Jun. 4, 1980

[51] Int. Cl.³ .................................... B24B 23/02
[52] U.S. Cl. ...................... 51/170 T; 51/273
[58] Field of Search ........... 51/170 T, 170 R, 177, 51/273

[56] References Cited

U.S. PATENT DOCUMENTS

| | | | |
|---|---|---|---|
| 1,312,235 | 8/1919 | Caurechi | 51/177 |
| 1,581,855 | 4/1926 | May | 51/170 T |
| 1,622,592 | 3/1927 | Kratz | 51/170 T |
| 1,928,390 | 9/1933 | Myers | 51/177 |
| 3,722,147 | 3/1973 | Brenner | 51/170 T |
| 4,058,936 | 11/1977 | Marton | 51/170 T |

*Primary Examiner*—Harold D. Whitehead
*Attorney, Agent, or Firm*—Morris A. Case; Bernard A. Donahue

[57] ABSTRACT

A multiplicity of abrading discs are individually mounted in an abrading head. The discs are each self-aligning for following the contour of the surface to be abraded. The discs are rotated to abrade the surface and a multiplicity of openings in the head permit debris, generated by the discs, to be removed from the work by a vacuum source attached to the head.

5 Claims, 7 Drawing Figures

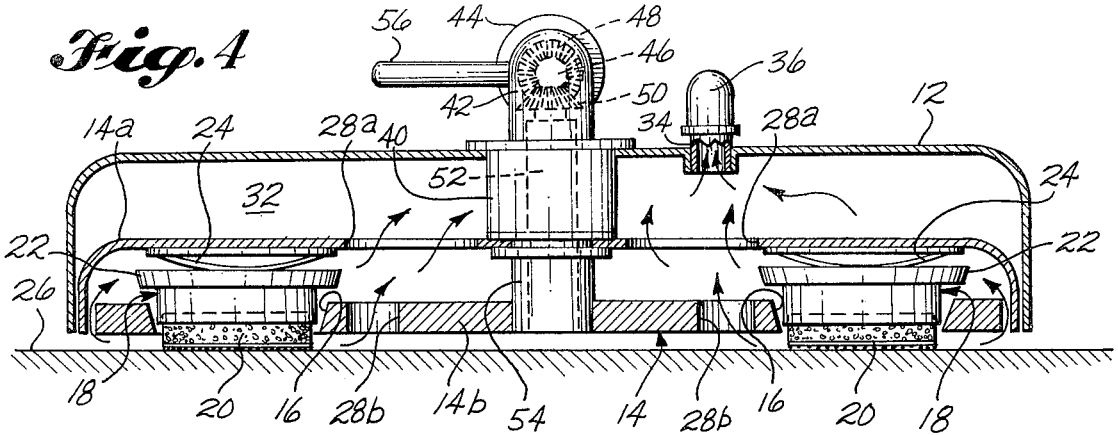
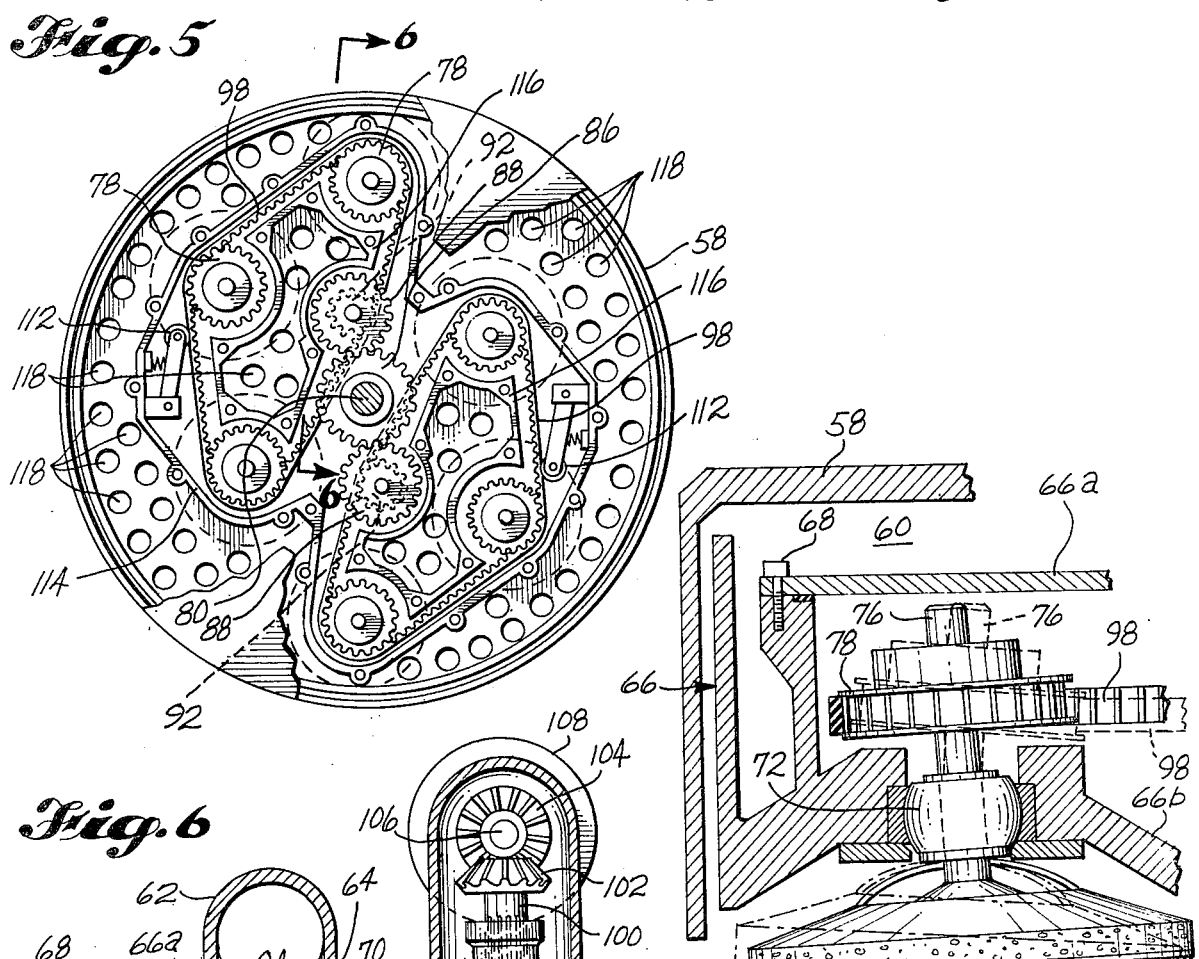
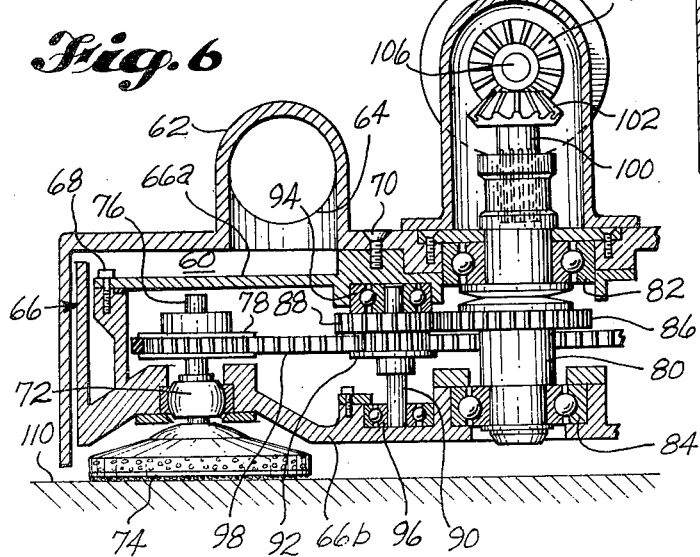

MULTIPLE SPINDLE FLEXIBLE SANDING HEAD

BACKGROUND OF THE INVENTION

There are numerous devices such as the disc, drum or orbital sander used to remove material from a surface to smooth that surface. If it is desired to remove the debris from the abrading action, many of the devices use an aspirator or a vacuum to continuously remove the debris. U.S. Pat. No. 3,815,292 shows the use of an aspirator to create a vacuum through an orbital or a disc type of sander. U.S. Pat. No. 3,932,966 shows a disc sander with apertures, openings, and orifices in the abrasive layers for combining with a vacuum source for abrading and removing material from a surface. Numerous types of abrading devices were used in connection with the removal of material for smoothing a large contoured surface such as an aircraft wing. None of the devices were satisfactory, as the devices were either too slow or did not accurately follow the contour. It was found that a smoothing, debris removing device could be made that is fast and effective.

SUMMARY OF THE INVENTION

A multitude of spaced apart abrading discs are mounted to a supporting member with all the discs extending in the same direction. The discs are resiliently mounted to the support member with each disc self-aligning to follow the contour of a surface to be abraded. The support member has a series of openings to permit passage of air into a hood type housing that is open ended in the direction to which the discs extend. The discs are rotated to abrade a surface to be smoothed, and a vacuum source communicating to the housing removes the debris generated by the moving discs.

It is an object of this invention to provide an abrading device to rapidly smooth a contoured surface.

DESCRIPTION OF THE DRAWINGS

FIG. 4 shows a side elevational sectional view taken along lines 4—4 of FIG. 3.

FIG. 5 shows a bottom view of a different embodiment of this invention with abrading heads shown in phantom and the structure partially cut away to permit a better view of the drive system.

FIG. 6 shows a fragmented, side elevational, sectional view taken along lines 6—6 of FIG. 5.

FIG. 7 shows an enlarged fragmented view of FIG. 6.

DETAILED DESCRIPTION

Figure 1:
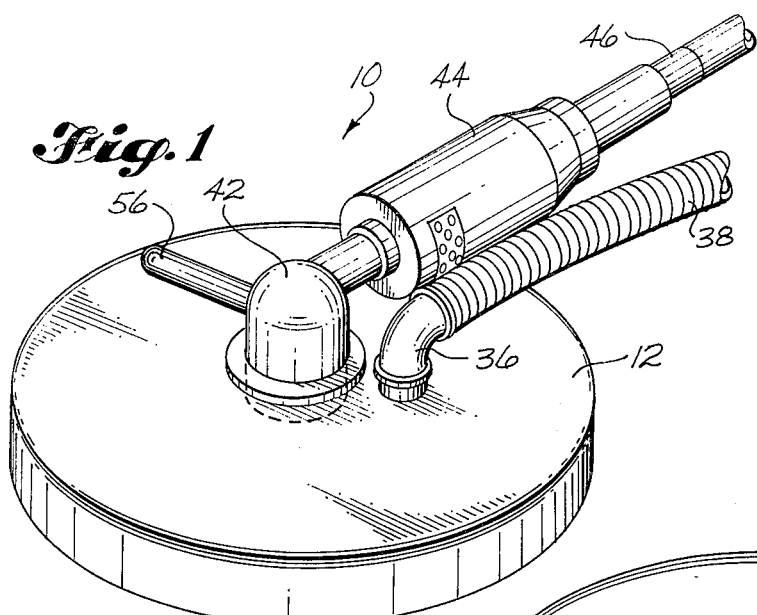
FIG. 1 shows a perspective top view of an abrading head of this invention.
Figure 2:
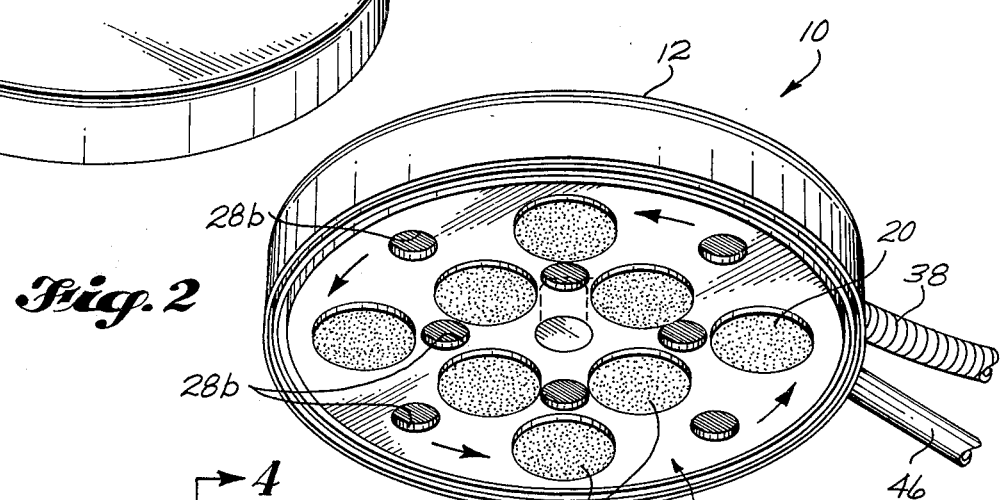
FIG. 2 shows a bottom perspective view of the abrading head of this invention.
Figure 3:
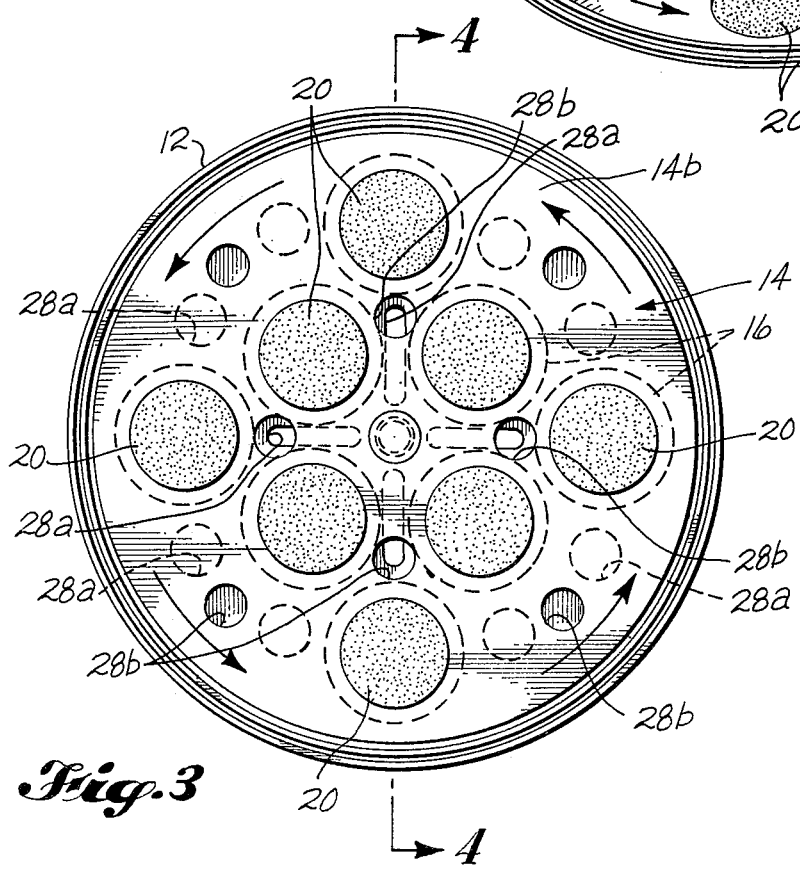
FIG. 3 shows a bottom view of the abrading head of this invention.

An abrading head 10 has a housing 12 open ended in one direction to act like a hood. A support member 14 with inner member 14a and outer member 14b is located in the housing. The outer support member 14b has a series of spaced apart openings 16 shaped like an outward extending frustum of a cone. A free floating cylindrical shaped member or head 18 is sized to fit in each opening. These members have an abrasive disc 20 on the outer end and an enlarged diameter 22 at the other end. Each cylindrical shaped member is continuously being urged outward by a compression spring 24 mounted to the inner support member 14a to continually press the abrasive disc into contact with and to follow the contour of the surface 26 to be abraded. A series of openings 28a are located in inner support member 14a and a series of holes or openings 28b are located in outer support member 14b to provide communication between the surface 26 and chamber 32 formed inside the housing 12. A coupling 34 extends through the housing 12, joins to an elbow 36 and a flexible hose 38 for connection to a vacuum source, not shown.

A bushing 40 is centrally located in the closed end of the housing and extends inward toward the support member. A gear case 42 joins to the bushing then connects to an air motor 44 which is fed from a source of compressed air, not shown, through line 46. The air motor drives shaft 46 which acts through bevel gears 48 and 50 to drive shaft 52; which rotates inside the bushing 40. The drive shaft 52 is also joined to a sleeve 54; which acts to join the inner and outer support members for rotating the abrasive discs in response to action by the motor. In this embodiment, handle 56 is fastened to the gear case to provide hand operation of the abrading head. However, it is not intended to limit this to a hand held operation as the positioning of the head may also be accomplished by any known automatic means, such as, by use of programmed cylinder actuation.

In operation, the abrading head 10 is positioned with the abrasive discs 20 contacting surface 26 to be abraded. The air motor 44 is turned on to rotate the support members with abrasive discs and the head moves with respect to the surface until the required amount of material has been removed from that surface. The vacuum source is also turned on to remove the debris.

FIGS. 5-7 show another embodiment of this invention where each abrading disc or head is individually rotated. Housing 58 acts as a hood, has a chamber 60 and an enlarged area 62 where connector 64 is joined for communication with a vacuum source, not shown. A support member 66 is made up of an upper plate 66a joined by fasteners 68 to a formed member 66b. This support member, in turn, is joined by fastener 70 to the inside of the housing.

A series of self-aligning spherical bearings 72 are mounted to the formed member 66b. An abrasive disc 74, with spindle or rod 76 is joined to the spherical bearing with the disc extending outward and a sprocket 78 mounted to the inside end of the spindle. A drive shaft 80 is mounted to rotate in a pair of ball bearings 82 and 84. The drive shaft has a drive gear 86 located to engage a gear 88 mounted on a driven roll 90. The driven roll also has a sprocket 92 and the roll is freely rotatable as it is held at the ends with ball bearings 94 and 96. A flexible drive belt 98 extends from the sprocket on the idler roll 90 and the sprockets 78 on the spindle rods 76. Drive shaft 80 accepts a shaft 100 which has a bevel gear 102 on the end to engage bevel gear 104. That gear is driven through rod 106 by a pneumatic motor 108. When this motor is turned on, the gear train acts through driven gear 88 to rotate the driven roll with sprocket to move the belt and individually rotate each disc. The self-aligning spherical bearing in combination with the flexible belt permits the discs to individually align to follow the contour of surface 110. A resiliently mounted idler roll 112 is located to keep tension on the belt.

A resilient barrier member 114 is located to lie outside the gear and drive system, and a pair of resilient barriers 116 are located near the inside of the flexible belt. A multiplicity of openings 118 extend through the support member 66. These openings are located outside barrier 114 and are also located inside barrers 116.

To operate this embodiment, the abrading head is placed with abrading discs on surface 110. The air motor is turned on to individually rotate each disc 74 and a vacuum source is also turned on to pull debris through the support member into the housing chamber where the debris is removed through line 64.

I claim:

1. An abrading apparatus for removing material from a surface comprising: a housing open ended on one side, a bearing centrally located in the closed side of the housing and extending toward the open side, a drive shaft mounted in the bearing, an inner support member and an outer support member fastened to the drive shaft with the outer support member having a multiplicity of spaced apart openings shaped like an outward extending frustrum of a cone, a free floating cylindrical shaped head located in each opening with an abrasive disc on the outer end and an enlarged diameter on the inner end, means for continuously urging each cylindrical shaped head outward to permit individual alignment of each head when contacting a contoured surface to be abraded, means for actuating the drive shaft to rotate the support members with heads, and means for removal of debris generated by the abrasive heads.

2. An abrading apparatus for removing material from a surface as in claim 1 wherein the means for removal of debris comprises, a vacuum unit connected to the housing and a series of holes through the supporting members.

3. An abrading apparatus for removing material from a surface as in claim 2 wherein the series of holes through the supporting members are located between the openings for the heads.

4. An abrading apparatus for removing material from a surface as in claim 1 wherein the means for continuously urging each cylindrical shaped head outward comprises a separate compression spring mounted to the inner support member to contact each head.

5. An abrading apparatus for removing material from a surface comprising: a housing open ended on one side, a bearing centrally located in the closed side of the housing and extending toward the open side, a drive shaft mounted in the bearing, an inner support member and an outer support member fastened to the drive shaft with the outer support member having a multiplicity of spaced apart openings with each opening shaped like an outward extending frustrum of a cone, a compression spring mounted to the outside of the inner support member and located axially with respect to each opening in the outer support member, a free floating cylindrical shaped head located in each opening with an abrasive disc on the outer end and an enlarged diameter on the inner end to be contacted by the compression spring to continuously be urged outward to permit individual alignment of each head when contacting a contoured surface to be abraded, means for rotating the drive shaft, a vacuum unit connected to the housing, and a series of holes through the supporting members to permit communication between an abraded surface and the vacuum connection.

* * * * *